United States Patent
Yolton

(10) Patent No.: US 10,501,825 B2
(45) Date of Patent: Dec. 10, 2019

(54) CUSTOM TITANIUM ALLOY FOR 3-D PRINTING AND METHOD OF MAKING SAME

(71) Applicant: Charles Frederick Yolton, Moon Township, PA (US)

(72) Inventor: Charles Frederick Yolton, Moon Township, PA (US)

(73) Assignee: Carpenter Technology Corporation, Philadelphia, PA (US)

( * ) Notice: Subject to any disclaimer, the term of this patent is extended or adjusted under 35 U.S.C. 154(b) by 217 days.

(21) Appl. No.: 15/587,584

(22) Filed: May 5, 2017

(65) Prior Publication Data

US 2017/0335432 A1     Nov. 23, 2017

Related U.S. Application Data

(60) Provisional application No. 62/338,018, filed on May 18, 2016.

(51) Int. Cl.
| | |
|---|---|
| *C22C 1/04* | (2006.01) |
| *B33Y 70/00* | (2015.01) |
| *B22F 1/00* | (2006.01) |
| *C22C 1/02* | (2006.01) |
| *C22C 14/00* | (2006.01) |
| *B22F 3/105* | (2006.01) |

(52) U.S. Cl.
CPC .......... *C22C 1/0458* (2013.01); *B22F 1/0003* (2013.01); *B22F 3/1055* (2013.01); *B33Y 70/00* (2014.12); *C22C 1/02* (2013.01); *C22C 14/00* (2013.01); *B22F 2301/205* (2013.01); *Y02P 10/295* (2015.11)

(58) Field of Classification Search
CPC ......... C22C 1/0458; C22C 1/02; C22C 14/00; B33Y 70/00; B22F 1/0003; B22F 3/1055; B22F 2301/205
See application file for complete search history.

(56) References Cited

U.S. PATENT DOCUMENTS

| | | | |
|---|---|---|---|
| 5,332,545 A | 7/1994 | Love | |
| 5,759,484 A * | 6/1998 | Kashii | C22C 14/00 148/421 |
| 9,969,004 B2 * | 5/2018 | Kanou | B22F 3/20 |
| 2012/0076686 A1 | 3/2012 | Bryan et al. | |
| 2014/0271336 A1 | 9/2014 | Colombo et al. | |
| 2016/0108508 A1 | 4/2016 | Thomas et al. | |
| 2016/0175929 A1 * | 6/2016 | Colin | C04B 35/62839 419/23 |

FOREIGN PATENT DOCUMENTS

| | | |
|---|---|---|
| JP | 2004-010963 A | 1/2004 |
| WO | WO 2017-200797 A1 | 11/2017 |

OTHER PUBLICATIONS

ATI Ti—6—Al—4V, Grade 5. ATK Technical Data Sheet.Version 1, Jan. 31 Four pages (Year: 2012).*
"Standard Specification for Additive Manufacturing Titanium-6 Aluminum-4 Vanadium ELI (Extra Low Interstitial) with Powder Bed Fusion." ASTM International Designation: F3001-14. Published Mar. 2014 (Year: 2014).*
Greitemeier, Daniel. et al. Uncertainty of Additive Manufactured Ti—6Al—4V: Chemical Composition, Microstructure and Mechanical Properties. Applied Mechanics and Materials. vol. 7, pp. 169-180. doi:10.4028/www.scientific.net/AMM.807.169 (Year: 2015).*
Colin et al. Derwent Acc No. 2015-03444H for patent family including FR 3008014 A1 (Jan. 9, 2015) and US 20160175929 A1 (Jun. 23, 2016). (Year: 2015).*
International Search Report for PCT/US2017/031691, filed May 9, 2017; dated Jul. 11, 2017.
Written Opinion of the International Searching Authority for PCT/US2017/031691, filed on May 9, 2017; dated Jul. 11, 2017.
N/A: "Standard Specification for Titanium and Titanium Alloy Bars and Billets", Aug. 31, 2013 (Aug. 31, 2013 ), West Conshohocken, PA DOI: 1 0.1520/B0348-13 Retrieved from the Internet: URL:https://compass.astm.org/download/B348.24730.pdf [retrieved on Aug. 28, 2019].
Lee, C.K.: "Wear and corrosion behavior of electrodeposited nickel carbon nanotube composite coatings on Ti 6AI 4V alloy in Hanks solution", Tribology International, Elsevier Ltd, Amsterdam, NL, val. 55, May 22, 2012 (May 22, 2012), pp. 7-14.
Tang, H.P. et al: "Effect of Powder Reuse Times on Additive Manufacturing of Ti-6AI-4V by Selective Electron Beam Melting", JOM: Journal of Metals, Springer New York LLC, United States, vol. 67, No. 3, Feb. 5, 2015 (Feb. 5, 2015), pp. 555-563.
Gao, S.Y. et al: "Research on Laser Direct Deposition Process of Ti-6AI-4V Alloy", Acta Metallurgica Sinica, Editorial Board of Acta Metallurgica Sinica, Sheyang, CN, vol. 20, No. 3, Jun. 1, 2007 (Jun. 1, 2007 ), pp. 171-180.

* cited by examiner

*Primary Examiner* — Tima M. McGuthry-Banks
(74) *Attorney, Agent, or Firm* — Nixon & Vanderhye P.C.

(57) ABSTRACT

A Ti-6A1-4V titanium powder alloy composition having enhanced strength resulting from the addition of one or more of the following elements without requiring an increase in oxygen content:
  Aluminum
  Iron
  Nitrogen
  Carbon
  The composition may also be used for Ti-6A1-4V titanium alloy starting bar stock.

3 Claims, No Drawings

CUSTOM TITANIUM ALLOY FOR 3-D PRINTING AND METHOD OF MAKING SAME

CROSS-REFERENCE TO RELATED APPLICATIONS

The present application claims the priority of Provisional Application No. 62/338,018 filed on May 18, 2016 and entitled "CUSTOM TITANIUM ALLOY FOR 3-D PRINTING".

BACKGROUND OF THE INVENTION

I. Field of the Invention

3-D printing technology has advanced into mainstream manufacturing for polymer based material systems and has caused a revolution in computer based manufacturing. Polymers based 3-D manufacturing maturation started with basic printing technology and existing polymer formulations. As it matured, the technology and polymer formulations evolved synergistically to deliver desired performance. Metals based 3-D printing is less mature but is beginning to follow a rapid growth curve. The metals printing technologies have narrowed primarily to powder-bed printing systems based on electron-beam, and laser direct melt and binder-jet technologies. Due to being in the early stages of maturation, little has been done to customize alloy composition to optimize overall 3-D manufactured part performance. Of the alloys being applied, refractory alloys such as titanium are among the least mature in this respect.

II. Description of the Prior Art

Problem:

The primary cost driver for all three primary 3-D manufacturing methods for titanium parts is the cost of titanium powder. As a result, the efficient use of the titanium powder is essential to successful market expansion of that product. The powder bed printing methods utilize a build box in which the component is built up layer by layer from powder. At completion the build box is full of powder and the component produced is within the box filled with the powder. After printing, the loose powder is removed from around the part and finishing operations are performed on the part. Since only a small fraction of the powder in the build box is incorporated into the part, there is a significant incentive to reuse the excess high cost powder.

Of the three primary 3-D printing methods applied to titanium alloys, the direct melt technologies based on electron-beam and laser melting represent the majority of titanium part manufacture but the excess titanium powder suffers from oxygen pickup each cycle through the process. The most common alloy for titanium parts is Ti-6Al-4V, grade 5 with a maximum allowable oxygen content of 0.2 wt %. Consequently the manufacturers want to start with as low an oxygen content in the powder as possible to enable the maximum number of re-use cycles for the powder before the oxygen content exceeds the specification limit.

At the same time, the customers for the 3-D printed Ti-6Al-4V parts want maximum mechanical tensile strength. The typical approach to achieve high strength Ti-6Al-4V parts is to increase oxygen content close to the upper limit of the Ti-6Al-4V grade 5 specification. This of course results in the minimum number of re-use cycles since the oxygen content would quickly exceed that allowed in the specification. This creates a need for a custom Ti-6Al-4V powder alloy composition to compete with the Ti-6Al-4V grade 5 composition and achieve high strength while having an initial low oxygen content to allow the maximum number of re-use cycles.

BRIEF SUMMARY OF THE INVENTION

Solution:

Reviewing the ASTM B348 Grade 5 specification for Ti-6Al-4V grade 5 alloy reveals other strength enhancing elements in the alloy specification that can be used to enhance strength independently of oxygen.

Table 1 illustrates the standard composition specification for Ti-6Al-4V Grade 5 alloy. Oxygen is typically used to enhance strength because it is easy and as a single element it typically has the most effect on strength. Other elements which affect strength include: aluminum, iron, nitrogen, and carbon, each with a positive effect on strength. These elements are not significantly affected by the 3-D printing process, and a combination of these elements can achieve the same strength enhancing results as oxygen enhancement.

DETAILED DESCRIPTION OF THE INVENTION

Table 2 illustrates the specification for Ti-6Al-4V titanium powder alloy with aluminum, iron, nitrogen and carbon composition ranges that, when combined, provide the desired strength enhancement in the alloy without high initial oxygen content. Therefore the baseline strength of 3-D printed Ti-6Al-4V parts produced with this Ti-6Al-4V composition would be similar to higher oxygen Ti-6Al-4V and the Grade 5 parts but would have the low oxygen desired for maximum re-use of the powder. The strength would further increase as the powder picked up oxygen as a result of re-use resulting in an overall higher strength curve and a significantly lower cost of production.

TABLE 1

Composition of Ti—6Al—4V alloy as defined in the ASTM B348 Grade 5 specification
Ti—6Al—4V ASTM B348 Grade 5

| Element | Min wt % | Max wt % |
| --- | --- | --- |
| Aluminum | 5.5 | 6.75 |
| Vanadium | 3.5 | 4.5 |
| Iron | — | 0.4 |
| Oxygen | — | 0.2 |
| Nitrogen | — | 0.05 |
| Carbon | — | 0.08 |
| Hydrogen | — | 0.015 |
| Other Elements, each | — | 0.1 |
| Other Elements, total | — | 0.4 |
| Titanium | Balance | |

TABLE 2

Composition of Ti—6Al—4V enhanced strength titanium alloy.
Enhanced Strength Ti—6Al—4V

| Element | Min wt % | Max wt % |
| --- | --- | --- |
| Aluminum | 6.3 | 6.7 |
| Vanadium | 4.2 | 4.5 |
| Iron | 0.25 | 0.4 |
| Oxygen | 0.1 | 0.13 |
| Nitrogen | 0.02 | 0.05 |
| Carbon | 0.04 | 0.08 |
| Hydrogen | — | 0.0125 |
| Other Elements, each | — | 0.1 |
| Other Elements, total | — | 0.4 |
| Titanium | Balance | |

The following table lists the chemical analysis of starting bar stock formulated to produce enhanced strength Ti-6Al-4V powder.

TABLE 3

Composition of Ti—6Al—4V enhanced strength titanium alloy starting bar stock.

| Element | wt % |
| --- | --- |
| Aluminum | 6.44 |
| Vanadium | 4.28 |
| Iron | 0.20 |
| Oxygen | 0.09 |
| Nitrogen | 0.04 |
| Carbon | 0.05 |
| Hydrogen | 0.002 |
| Yttrium | <0.001 |
| Titanium | Balance |

The experimentally determined room temperature tensile properties of this starting stock are given in the following table with the required minimum properties for ASTM B348 Grade 5.

TABLE 4

Room temperature properties of enhanced strength titanium alloy starting bar stock.

| | Tensile Strength ksi (MPa) | 0.2% Yield Strength ksi (MPa) | Elongation % | Reduction of Area % |
| --- | --- | --- | --- | --- |
| Enhanced Ti—6Al—4V | 145 (1000) | 131 (905) | 16 | 44 |
| ASTM B348 Grade 5 | 130 (896) min | 120 (827) min | 10 min | 25 min |

As indicated in Table 4, the room temperature tensile properties of the enhanced Ti-6Al-4V meets the property requirements of the ASTM B348 Grade 5 specification although the oxygen content is well below the typical oxygen content of Grade 5 product. Conversion of this starting stock to powder will result in a small increase in oxygen content which will increase strength further with essentially no detriment to ductility.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of increasing the strength of Ti-6Al-4V titanium alloy powder or starting bar stock without increasing oxygen content, comprising adding to the powder or starting bar stock the following combination of elements:
   Aluminum
   Iron
   Nitrogen
   Carbon.

2. The method of claim 1 wherein the weight percent of the elements for the powder is:
   Aluminum—6.3 to 6.7%
   Iron—0.25 to 0.4%
   Nitrogen—0.02 to 0.05%
   Carbon—0.04 to 0.08%.

3. The method of claim 1 wherein the weight percent of the elements for the bar stock is:
   Aluminum—6.3% to 6.7%
   Iron—0.15% to 0.30%
   Nitrogen—0.02% to 0.05%
   Carbon—0.04% to 0.08%.

* * * * *